US010838541B2

(12) United States Patent
Hung et al.

(10) Patent No.: US 10,838,541 B2
(45) Date of Patent: Nov. 17, 2020

(54) METHOD FOR OPERATING HANDHELD DEVICE, HANDHELD DEVICE AND COMPUTER-READABLE RECORDING MEDIUM THEREOF

(71) Applicant: HTC Corporation, Taoyuan (TW)

(72) Inventors: Yu-Cheng Hung, Taoyuan (TW); Pei-Chun Tsai, Taoyuan (TW); Shih-Lung Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/120,323

(22) Filed: Sep. 3, 2018

(65) Prior Publication Data

US 2020/0073507 A1 Mar. 5, 2020

(51) Int. Cl.
*G06F 3/041* (2006.01)
*G06F 3/0481* (2013.01)

(52) U.S. Cl.
CPC .......... *G06F 3/0416* (2013.01); *G06F 3/0412* (2013.01); *G06F 3/0481* (2013.01); *G06F 2203/04104* (2013.01)

(58) Field of Classification Search
CPC ........ G06F 3/017; G06F 3/011; G06F 3/0346; G06F 3/044; G06F 2200/1637; G06F 2203/04105; G06F 3/0414; G06F 3/0488
See application file for complete search history.

(56) References Cited

U.S. PATENT DOCUMENTS

| 2015/0192989 | A1* | 7/2015 | Kim | G06F 3/011 345/156 |
| 2016/0179338 | A1* | 6/2016 | Miller | G06F 3/04817 |
| 2018/0136774 | A1* | 5/2018 | Cruz-Hernandez | G06F 3/0488 |

FOREIGN PATENT DOCUMENTS

| CN | 104536685 | 4/2015 |
| CN | 104735256 | 6/2015 |
| CN | 106254597 | 12/2016 |
| EP | 2175344 | 4/2010 |
| TW | I585673 | 6/2017 |

OTHER PUBLICATIONS

"Search Report of Europe Counterpart Application", dated Sep. 23, 2019, p. 1-p. 4.
"Office Action of Taiwan Counterpart Application", dated Mar. 13, 2020, p. 1-p. 8.

* cited by examiner

*Primary Examiner* — Gerald Johnson
(74) *Attorney, Agent, or Firm* — JCIPRNET

(57) ABSTRACT

A method for operating a handheld device, a handheld device, and a computer-readable recording medium thereof are provided. A first and a second sensors are disposed on a first and a second side of the handheld device, respectively. A processor of the handheld device is configured to determine the handheld device is in a left hand state or a right hand state according to a compared result between sensing data of the first and second sensors, and to display an operating interface corresponding to the right or left hand state on a display, where the compared result includes a force comparison between forces applied on the first and second sides of the handheld device, the first side corresponds to the right hand state, and the second side corresponds to the left hand state. Accordingly, a better operating experience for one hand can be provided.

20 Claims, 12 Drawing Sheets

METHOD FOR OPERATING HANDHELD DEVICE, HANDHELD DEVICE AND COMPUTER-READABLE RECORDING MEDIUM THEREOF

BACKGROUND OF THE DISCLOSURE

1. Field of the Disclosure

The present disclosure relates to a method for operating a handheld device, a handheld device, and a computer-readable recording medium thereof, and more particularly, relates to a handheld device being operated through sensors disposed on the sides of the handheld device.

2. Description of Related Art

Handheld device such as mobile phone, tablet PC and the like are popular and being used in all kind of occasions. People may use the handheld device for playing multimedia, web browsing, navigation, gaming, and etc. On the other hand, in recent years, the display technology has been developed with a significant breakthrough, lots of manufactories trend to design handheld devices with slim bezel, so as to increase screen-to-body ratios of the handheld devices and provide better visual experience to users. However, many users like handheld devices with large screen, but they generally operate the handheld device with one hand, so that a part of the screen may not be touched with one hand because of hand size. In addition, software developers usually do not design user interfaces (UIs) of the handheld devices for a special purpose of one hand use, so that the user have to operate with two hands in some situation. Accordingly, one hand experience for handheld devices should be improved.

SUMMARY OF THE DISCLOSURE

Accordingly, the present disclosure is directed to a method for operating a handheld device, a handheld device, and a computer-readable recording medium thereof, which determine the handheld device is held by left hand or right hand, so as to provide a corresponding UI for a specific hand.

In one of the exemplary embodiments, the handheld device at least includes, but not limited to, a body, a first sensor, a second sensor, and a processor. The first sensor is disposed on a first side of the body. The second sensor is disposed on a second side of the body different from the first side. The processor is coupled to the first and second sensors and configured to obtain sensing data of the first and second sensors, and to determine the handheld device is in a left hand state or a right hand state according to a compared result between sensing data of the first and second sensors, where the compared result includes a force comparison between forces applied on the first and second sides of the body, the first side of the body corresponds to the right hand state, and the second side of the body corresponds to the left hand state.

According to one of the exemplary embodiments, the compared result comprises a number comparison between numbers of touch point detected by the first and second sensors and a distance comparison between distances between two touch points on the first and second sides of the body, and the processor is configured to, in response to the number comparison being the same, determine the handheld device is in the left hand state or the right hand state according to the distance comparison in response to the number of touch point detected by one of the first and second sensors being two, and to determine the handheld device is in the left hand state or the right hand state according to the force comparison in response to the number of touch point detected by one of the first and second sensors being one.

According to one of the exemplary embodiments, the processor is configured to determine whether a force difference of the force comparison is larger than a force difference threshold to confirm the handheld device is in the left hand state or the right hand state.

According to one of the exemplary embodiments, the processor is configured to determine whether a touch area or a touch length detected on one of the first and second sides of the body is larger than a first threshold in response to the force difference being not larger than the force difference threshold, to confirm the handheld device is in the left hand state or the right hand state.

According to one of the exemplary embodiments, the handheld device further comprises a third sensor coupled to the processor. The processor is configured to determine an orientation of the body according to sensing data of the third sensor, and to determine the handheld device is in the left hand state or the right hand state according to the orientation of the body.

According to one of the exemplary embodiments, the compared result comprises a number comparison between numbers of touch point detected by the first and second sensors, and the processor is configured to, in response the number comparison being different, determine the handheld device is in the left hand state or the right hand state according to a touch area or a touch length detected on the first side of the body and the force comparison in response to the number of touch point detected by the second sensor being larger than the number of touch point detected by the first sensor, and to determine the handheld device is in the left hand state or the right hand state according to a touch area or a touch length detected on the second side of the body and the force comparison in response to the number of touch point detected by the first sensor being larger than the number of touch point detected by the second sensor.

According to one of the exemplary embodiments, the compared result comprises a number comparison between numbers of touch point detected by the first and second sensors. The processor is configured to determine the handheld device is in the left hand state or the right hand state according to a distance between two touch points on one of the first and second sides of the body in response the number comparison being different.

According to one of the exemplary embodiments, the processor is configured to determine the operational hand state is not in a hold state in response to numbers of touch points detected on the first and second sides of the body being both larger than two.

According to one of the exemplary embodiments, the processor is configured to determine the handheld device is not in a hold state in response to a number of touch point detected on one of the first and second sides of the body being zero or a total touch area or a total touch length detected on one of the first and second sides of the body being less than a second threshold. The hold state includes the left hand state and the right hand state.

According to one of the exemplary embodiments, the processor is configured to determine the handheld device is in a hold state in response to a total touch area or a total touch length detected on one of the first and second sides of the body being larger than a third threshold and at least one touch point being detected on both of the first and second sides of the body, wherein the third threshold is larger than the second threshold.

According to one of the exemplary embodiments, the handheld device further comprises a display coupled to the processor. The processor is configured to display an operating interface corresponding to the first side of the body on the display in response to the handheld device being in the right hand state, and display the operating interface corresponding to the second side of the body on the display in response to the handheld device being in the left hand state.

In one of the exemplary embodiments, the method for operating a handheld device is provided. The handheld device includes, but not limited to, a body, a first sensor disposed on a first side of the body and a second sensor disposed on a second side of the body different from the first side. The method includes the following steps. Sensing data of the first and second sensors is obtained. The handheld device being in a left hand state or a right hand state is determined according to a compared result between sensing data of the first and second sensors, where the compared result includes a force comparison between forces applied on the first and second sides of the body, the first side of the body corresponds to the right hand state, and the second side of the body corresponds to the left hand state.

In one of the exemplary embodiments, the non-transitory computer readable recording medium records computer program to be loaded by a processor of a handheld device having two sensors disposed on two sides thereof to execute the aforementioned method.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
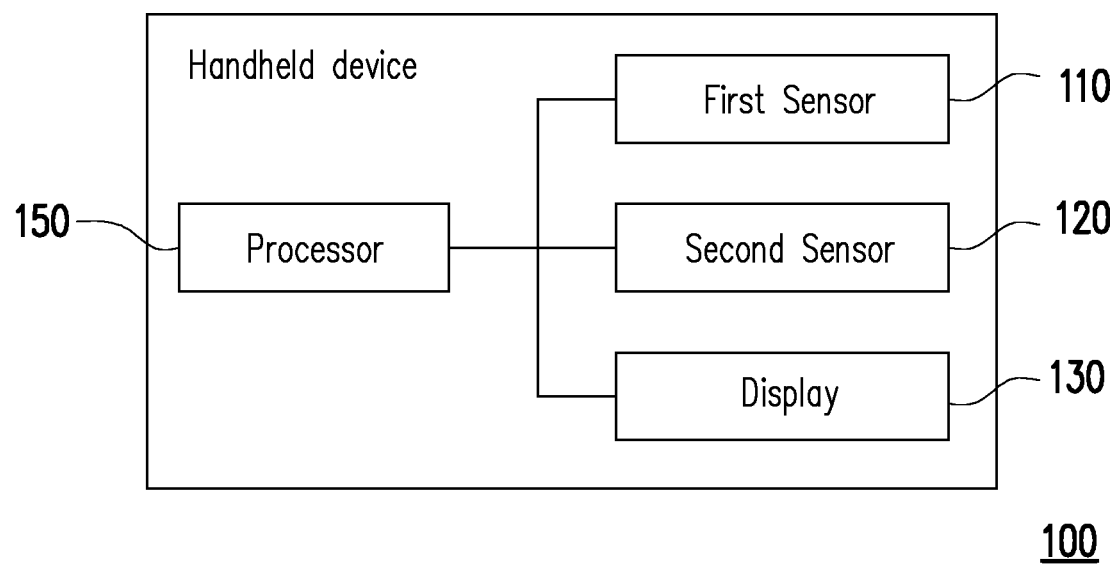
FIG. 1 is a block diagram illustrating a handheld device according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Referring to FIG. 1, FIG. 1 is a block diagram illustrating a handheld device 100 according to one of the exemplary embodiments of the disclosure. The handheld device 100 at least includes, but not limited to, a first sensor 110, a second sensor 120, a display 130 and a processor 150. The handheld device 100 could be mobile phone, tablet PC, camera, handheld game console, multimedia player, etc.

Figure 2A:
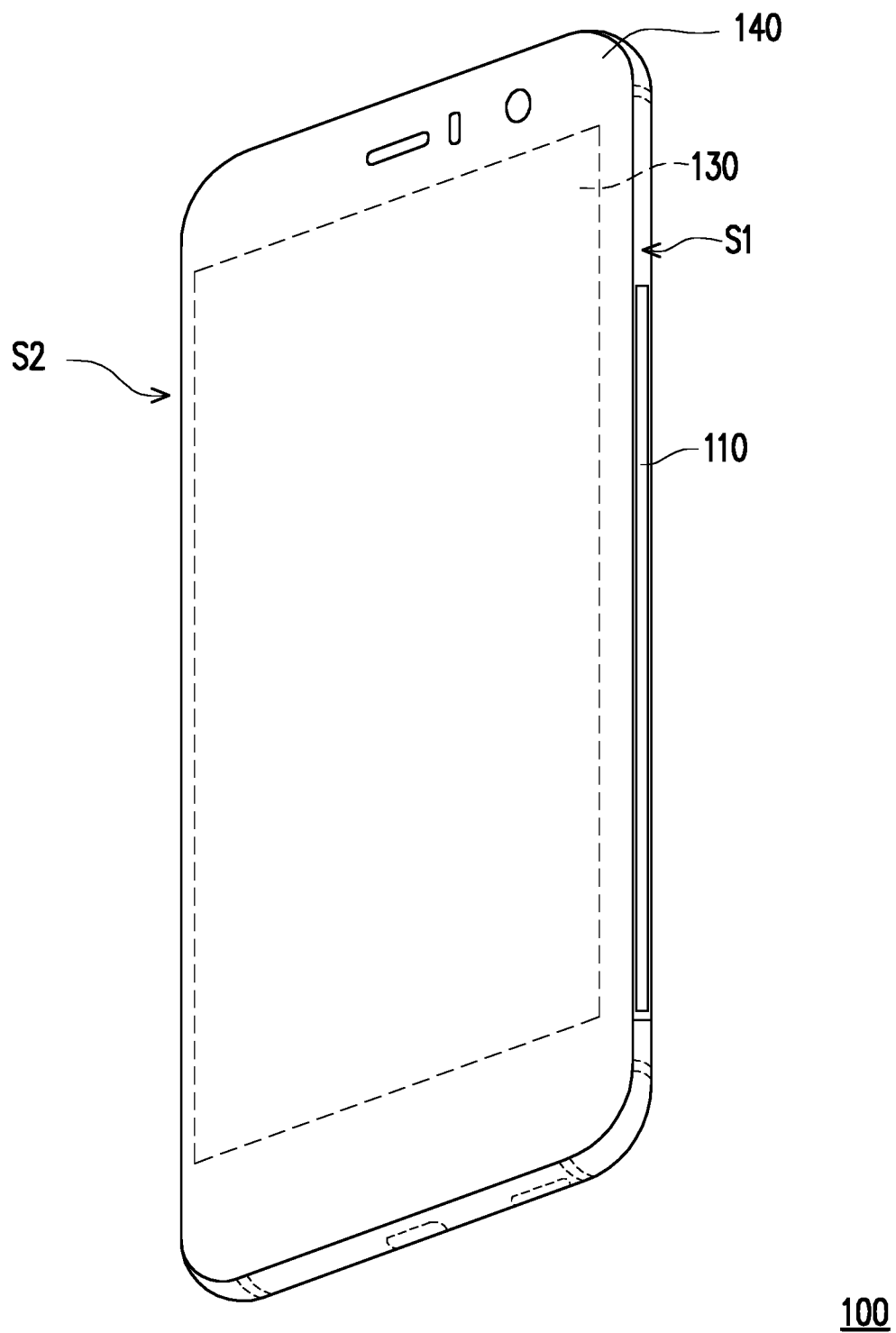
FIGS. 2A and 2B are schematic diagrams illustrating a handheld device according to one of the exemplary embodiments of the disclosure.
Figure 2B:
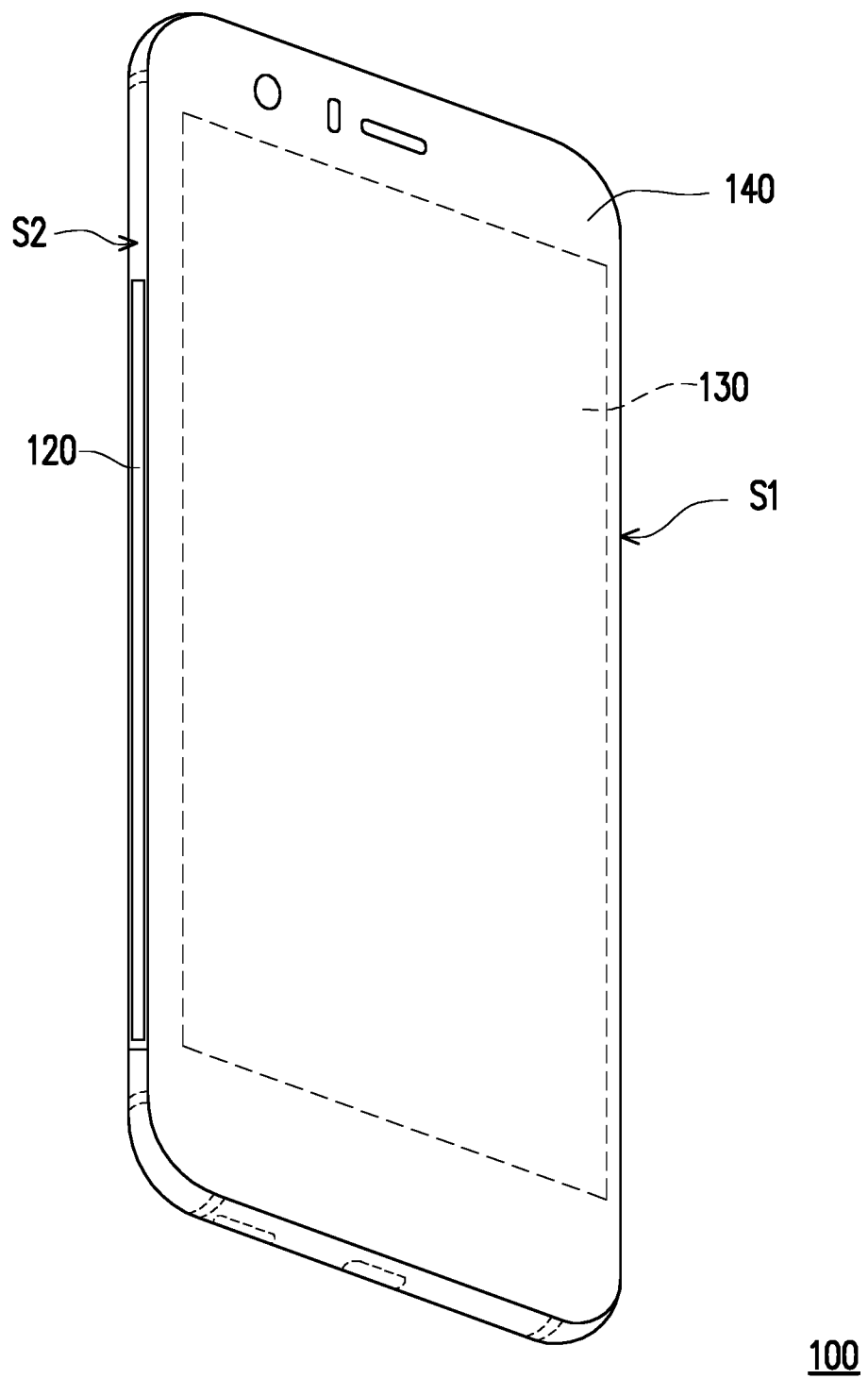

Referring to FIGS. 1, 2A and 2B, the first sensor 110 is disposed on a first side S1 of body 140 of the handheld device 100, and the second sensor 120 is disposed on a second side S2 of the body 140, where the second side S2 is opposite to the first side S1. In this embodiment, the first side S1 of the body 140 is the right side of the body 140, and the second side S2 is the left side of the body 140. The first sensor 110 and the second sensor 120 could be capacitive sensor, resistive sensor, piezoelectric sensor, electromagnetic sensor, other type of pressure sensors, or a combination of aforesaid sensors, to detect the presence of objects (e.g. finger, or clamp) being placed on the first side S1 and the second side S2, and generate sensing data including touch position, force or pressure related raw data.

It should be noticed that, the first and second sensor 110, 120 may cover a portion or entire of the first and second sides S1, S2, and each sensor 110, 120 may include a piece of sensing element or multiple sensing elements arranged on the corresponding side S1, S2 of the body 140 with single type sensor or various type of pressure sensors. If the sensing elements are arranged in one-dimension, for example, the arranged sensing elements form an line extended from the top to the button of side S1 or/and S2, the sensing data of the sensing elements can be used for detecting a touch length of object (e.g. finger, clamp, or other object). If the sending elements are arranged in two-dimension, for example, the arranged sensing elements form an rectangle shape having four sides near to edges of side S1 or/and S2, the sensing data of the sensing elements can be used for detecting a touch area of object (e.g. finger, clamp, or other object). It should be noticed that, the shapes formed by the arranged sensing elements on sides S1 and S2 can be modified according to actual requirement, and the exemplary embodiment of the disclosure is not limited thereto.

The display 130 could be a liquid crystal display (LCD), light emitting diode (LED), organic light emitting diode (OLED), or other type of display. Two sides of the display 130 locates near the first and second sides S1, S2 of the body 140 as shown in FIGS. 2A and 2B. In one exemplary embodiment, the display 130 may be integrated with touch panel (including touch sensor such as resistive touch sensor, capacitive touch sensor, optic touch sensor or the likes), so as to provide display and touch sensing functions.

The processor 150 is coupled to the first sensor 110, the second sensor 120 and display 140. The processor 150 may be implemented by using a programmable unit, such as a central processing unit (CPU), a micro-processor, a micro-controller, a digital signal processing (DSP) chip, a field programmable gate array (FPGA), and so on. The function of the processor 150 may also be implemented by an independent electronic device or an integrated circuit (IC), and the operation of the processor 150 may also be implemented by software. The processor 150 is programmed to execute the functions or steps that would be described below.

In order to make the operation process of the embodiment of the disclosure more comprehensible, several embodiments are provided below to describe in detail the operations of the handheld device 100 in the embodiment of the disclosure.

Figure 3:
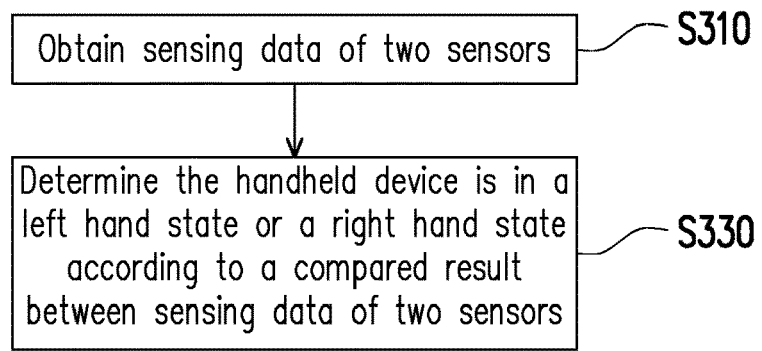
FIG. 3 is a flowchart illustrating a method for operating the handheld device according to one of the exemplary embodiments of the disclosure.

FIG. 3 is a flowchart of a method for operating the handheld device 100 according to one of exemplary embodiments of the disclosure. Referring to FIG. 3, the method of this embodiment is adapted for the handheld device 100 of FIGS. 1, 2A and 2B. In the following paragraphs, the method of this embodiment of the disclosure is described first with reference to the components of the handheld device 100. Nevertheless, the processes of this method may be adjusted according to the actual needs and thus are not limited to the following.

The processor 150 obtains sensing data of the first and second sensors 110, 120 (Step S310). The processor 150 may analyze the raw data (such as strength value and corresponding position) included in the sensing data, to determine the number, position, force and pressure of objects (e.g. finger or clamp) detected or applied on two sides S1, S2 of the body 140.

Then, the processor 150 determines the handheld device 100 is in a left hand state or a right hand state according to a compared result between sensing data of the first and second sensors 110, 120 (Step S330). Specifically, in general, when user holds the body 140 of the handheld device 100 by his/her right hand, the thumb and/or palm of the right hand abuts against the first side S1 of the body 140, and at least one of the other fingers of the right hand abuts against the second side S2 of the body 140. On the other hand, when the user holds the body 140 by his/her left hand, the thumb and/or palm of the left hand abuts against the second side S2 of the body 140, and at least one of the other fingers of the left hand abuts against the first side S1 of the body 140. If a situation that the body 140 is held by the right hand is detected, the processor 140 determines an operational hand state is the right hand state (i.e., the handheld device 100 is in the right hand state). If another situation that the body 140 is held by the left hand is detected, the processor 140 determines the operational hand state is the left hand state (i.e., the handheld device 100 is in the left hand state). In addition, the user usually uses the thumb to operate the handheld device 100 (or touch the display 140) no matter which hand he/she uses. Thus, in this embodiment, the first side S1 of the body 140 is defined as corresponding to the right hand state because the thumb of right hand abuts against the first side S1. The second side S2 of the body 140 is defined as corresponding to the left hand state because the thumb of the left hand abuts against the second side S2. In addition, the compared result may include one or any combination of number comparison, force comparison, distance comparison and touch lengths/areas of touch point on two sides S1 and S2, which would be discussed in detail later.

Figure 4:
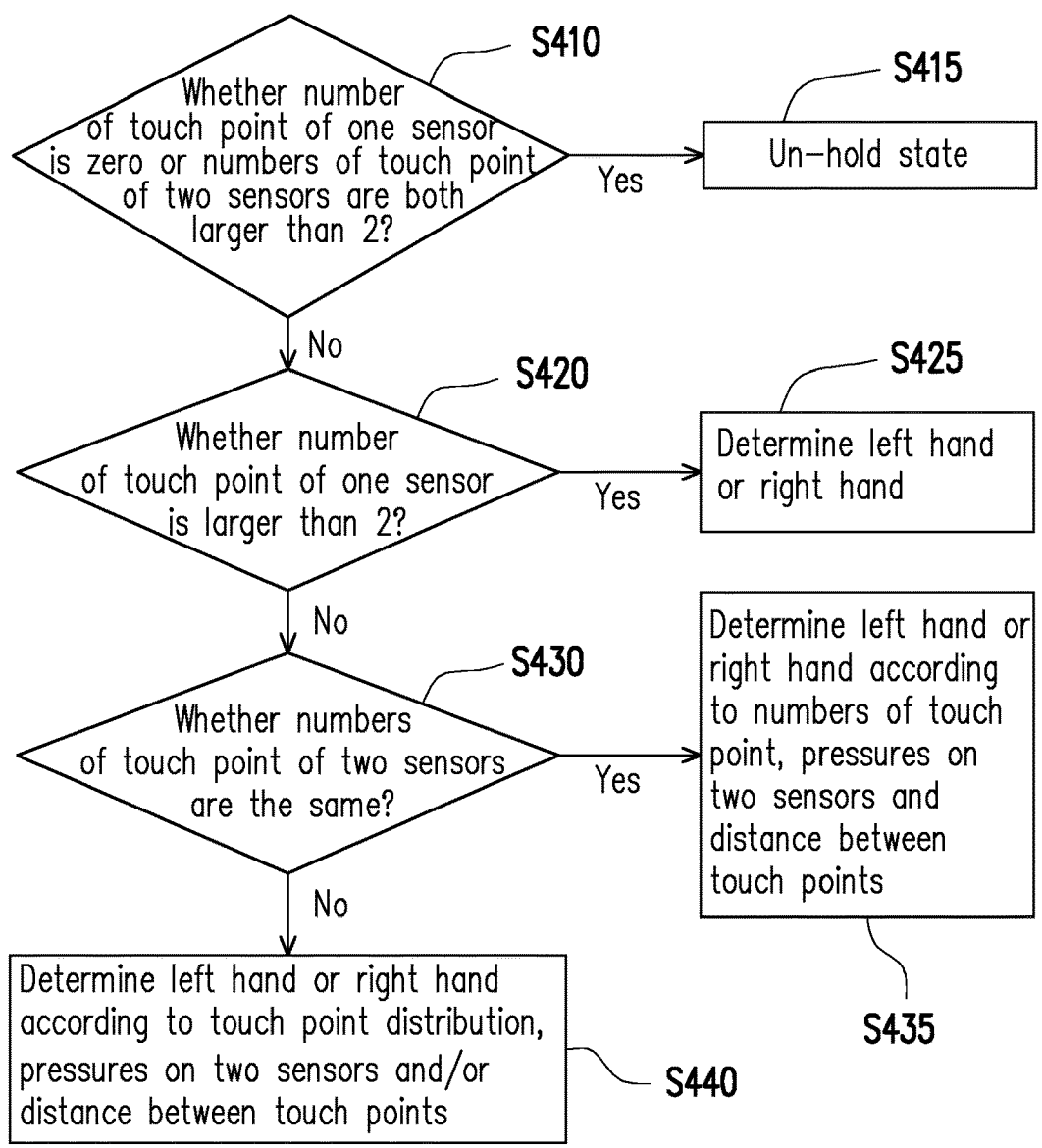
FIG. 4 is a flowchart illustrating a procedure of the handheld device for determining an operational hand state according to one of the exemplary embodiments of the disclosure.

In order to provide one hand experience, the subsequent step is to detect that the handheld device 100 is held by which hand of user. Referring to FIG. 4, FIG. 4 is a flowchart illustrating a procedure of the handheld device 100 for determining the operational hand state according to one of the exemplary embodiments of the disclosure. It is assumed that processor 150 detects the operational hand state is a hold state (i.e., the body 140 is held by hand), and the determination of the hold state would be described below in detail. In general, when the handheld device 100 is held by one hand, the numbers of touch point, distances between two touch points, touched areas (or touch length) and applied forces on the two side S1, S2 of the body 140, which are detected by the first and second sensors 110, 120, may be the same or different, these number comparison, distance comparison, area comparison and force comparison between two sides S1, S2 would help to determine operational hand state of the handheld device 100.

The processor 150 determines whether the number of touch point detected by one of the first and second sensors 110, 120 is zero or the numbers of touch point detected by the two sensors 110, 120 are both larger than two (S410)? It is assumed that, when the handheld device 100 is held by one hand, one of the first and second sensors 110, 120 may detect at most two touch points on one side of the body 140 against which a thumb and/or a palm abuts, where the two touch points may be generated by the thumb and/or a part of palm. If none of fingers is detected on one of the sides S1, S2 of the body by the first or second sensor 110, 120, or if more than two fingers are detected on both sides S1, S2 of the body 140 by the first and second sensors 110, 120, the chance is high that the handheld device 100 is not held by hand, so that the processor 150 determine the operational hand state is a un-hold state (i.e., the handheld device 100 is not in a hold state, where the hold state includes the left hand state and the right hand state) (Step S415). For example, the body 140 is held by a mobile holder, so that more than two touch points are detected on two side S1, S2. The body 140 is merely rested or abutted against hand, but is not held by hand, so that at least one of the sensors 110, 120 does not detect any touch point. On the other hand, if at least one of fingers or at least one part of palm is detected by both sensors 110, 120 and the numbers of touch points detected on both sides S1, S2 of the body 140 are not both larger than two, the processor 150 determine the operational hand state is still the hold state. In other words, if the numbers of touch points detected on both sides S1, S2 both are between 1 and 2, or if the number of touch point detected on one side S1/S2 is larger than two and the number of touch point detected on the other side S2/S1 is less than three, the operational hand state is still in the hold state.

Then, the processor 150 determines whether the number of touch point detected by one of the first and second sensors 110, 120 is larger than two (Step S420)? It is assumed that, when the handheld device 100 is held by one hand, one of the first and second sensors 110, 120 may detect more two touch points on one side of the body 140 opposite to the other side of body 140 against which a thumb abuts, where the touch points may be generated by index finger, middle finger, ring finger or little finger. If more than two fingers are detected on the first side S1 of the body 140, the processor 150 determines the handheld device 100 is in the left hand state; if more than two fingers are detected on the second side S2 of the body 140, the processor 150 determines the handheld device 100 is in the right hand state (Step S425).

On the other hand, if the numbers of touch points of the first and second sensor 110, 120 are both not larger than 2, the processor 140 determines whether the numbers of touch point detected by the first and second sensors 110, 120 are the same or whether the number comparison between the numbers of touch point detected on the first and second sides S1, S2 of the body 140 is zero (Step S430)? Different compared results would lead the step into different determination procedures. If the number comparison of the compared result is that the number difference is zero or the numbers are the same (e.g. the numbers of touch point detected by the first and second sensors 110, 120 are both one or two), the processor 150 would determines the operational hand state is the left or right hand state according to the number of touch point, pressure (or force) on two sensors 110, 120 and the distance between touch points detected on each sensor 110, 120 (Step S435, it is called a first determination procedure).

Figure 5:
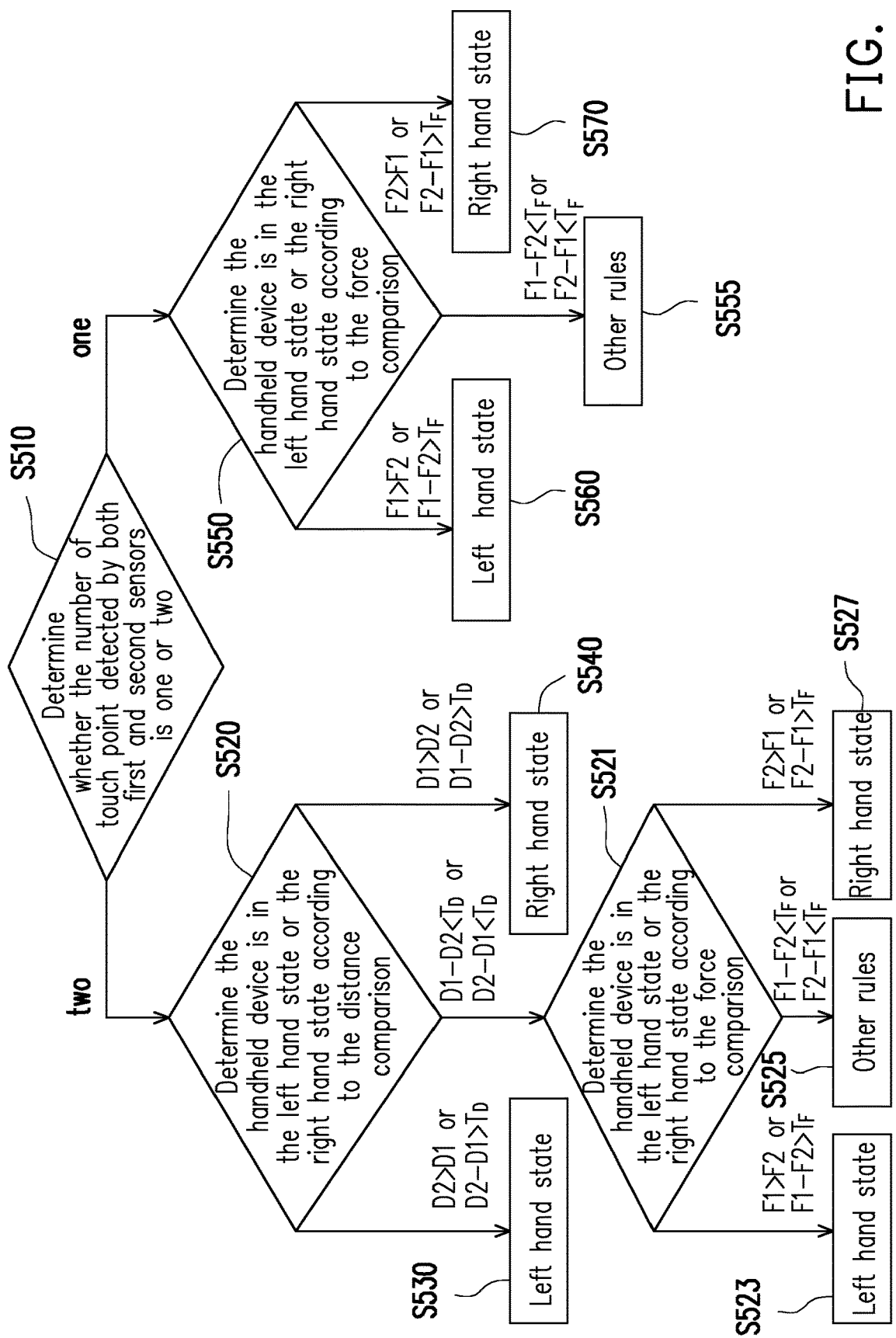
FIG. 5 is a flowchart illustrating a procedure of the handheld device for determining the operational hand state according to one of the exemplary embodiments of the disclosure.

Referring to FIG. 5, in the first determination procedure (i.e. in response to the number comparison being the same), the processor 150 would determine whether the number of touch point detected by both first and second sensors 110, 120 is one or two (Step S510). If the number of touch point detected by both first and second sensors 110, 120 is two, the processor 150 would determine the handheld device 100 is in the left hand state or the right hand state according to the distance comparison (e.g. the difference between distance between two touch points on the first side S1 and distance between two touch points on the second side S2) (Step S520). It is assumed that, when the handheld device 100 is held by one hand, a first distance between one position against which the thumb abuts and another position against which the palm abuts may be larger than a second distance between any two positions against which the other two neighboring fingers abut. Therefore, if the distance comparison is that the distance D2 between two touch points on the first side S2 is larger than the distance D1 between two touch points on the second side S1 or the subtraction of the distance D1 from the distance D2 is larger than a threshold $T_D$, the processor 150 determines the handheld device 100 is in the left hand state (Step S530); if the distance comparison is that the distance between two touch points on the second side S1 is larger than the distance between two touch points on the first side S2 or the subtraction of the distance D2 from the distance D1 is larger than the threshold $T_D$, the processor 150 determines the handheld device 100 is in the right hand state (Step S540).

If the subtraction of the distance D1 from the distance D2 or the subtraction of the distance D2 from the distance D1 is not larger than the threshold $T_D$, the processor 150 may further determine whether the force difference of the force comparison between two forces F1, F2 applied on two sides S1 and S2 is larger than a force difference threshold $T_F$ to determine the handheld device 100 is in the left hand state or the right hand state (Step S521). If the force difference is larger than the force difference threshold $T_F$ (i.e. F1−F2>$T_F$) or the force F1 applied on the first side S1 is larger than the force F2 applied on the second side S2 (i.e. F1>F2), the processor 150 would determine that the handheld device 100 is in the left hand state (Step S523). If the force difference is larger than the force difference threshold $T_F$ (i.e. F2−F1>$T_F$) or the force F2 applied on the second side S2 is larger than the force F1 applied on the first side S1 (i.e. F2>F1), the processor 150 would determine that the handheld device 100 is in the right hand state (Step S527).

It should be noticed that, in the Step S521, because there are two forces applied on both sides S1, S2 of the body 140, the processor 150 can determine one force on each side S i/S2 for the force comparison. For example, the processor 150 may use the maximum force detected on side S1 to compare with the maximum force detected on the side S2. Alternatively, the processor 150 may use the average force detected on side S1 to compare with the average force detected on the side S2.

However, if the force difference is not larger than the force difference threshold $T_F$ (i.e. F1−F2<$T_F$ or F2−F1<$T_F$), the processor 150 use other rules to determine the hold state (Step S525). There are multiple rules, in one exemplary embodiment, if the force difference is less than the force difference threshold $T_F$, the processor 150 can further determine whether a touch area or a touch length detected on one of the first and second sides S1, S2 of the body 140 is larger than a first threshold (e.g. 350 or 400 square millimetre, 60 or 63 millimetres) to confirm the handheld device 100 is in the left hand state or the right hand state. In general, the touch area of the thumb and/or the palm is larger than the other fingers. Therefore, if the touch area or the touch length detected on the first side S1 of the body is larger than the first threshold, the processor 150 determines the handheld device 100 is in the right hand state; if the touch area or the touch length detected on the second side S2 of the body is larger than the first threshold, the processor 150 determines the handheld device 100 is in the left hand state.

In still other exemplary embodiment, the handheld device 100 may further include a third sensor (not shown) coupled to the processor 150. The third sensor could be a g-sensor, a magnetic sensor, an accelerator, or other sensors that provide sensing data regarding to the orientation of the handheld device 100, so that the processor 150 may determine the orientation of the body 140 according to the sensing data of the third sensor. If the force difference is less than the force difference threshold $T_F$, the processor 150 can further determine the handheld device 100 is in the left hand state or the right hand state according to the orientation of the body 140 if the force difference is not larger than the force difference threshold $T_F$. Based on hand-hold posture, when a user holds the handheld device 100 by the right or left hand and watch the screen of the display 130, the tilt degrees relative to x and z axis can be used to determine that the user hold the handheld device 100 by the right or left hand to watch the screen. For example, if the orientation of the body 140 is toward the first side S1 of the body 140 (e.g. value of x axis is negative), the processor 150 determines the operational hand state is the left hand state. If the orientation of the body 140 is toward the second side S2 of the body 140 (e.g. value of x axis is positive), the processor 150 determines the operational hand state is the right hand state.

Figure 6A:
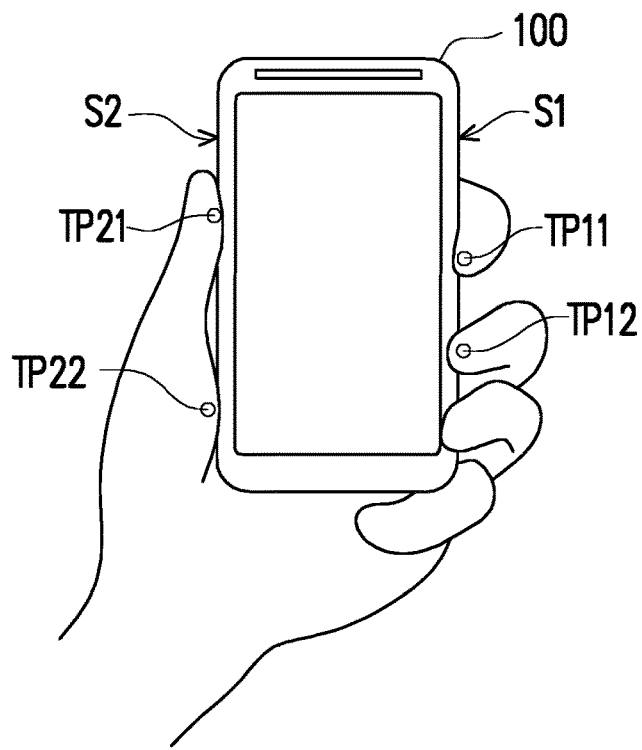
FIGS. 6A and 6B are schematic diagrams illustrating the handheld device is held in different way.

In the following, an example for two touch points detected by both two sensors 110, 120 would be introduced. FIG. 6A is schematic diagram illustrating the handheld device is held by a left hand. Referring to FIG. 6A, the index finger, middle finger and ring finger of the left hand abut against side S1. It assumed that the ring finger does not cover on the first sensor 110 of the handheld device 100, and the processor 150 would detect two touch points TP11 and TP12 on the side S1. In addition, the thumb and palm abut against side S2, and the processor 150 detects two touch points TP21 and TP22. Referring to FIGS. 5 and 6A, because there are two touch points TP11 and TP12 on the side S1 and two touch points TP21 and TP22 on the side S2, the processor 150 would determine the distance comparison in step S520. Because the distance comparison is that the distance D2 between the touch points TP21 and TP22 is larger than the distance D1 between the touch points TP11 and TP 12, the processor 150 would determine the handheld device 100 is in the left hand state (Step S530).

On the other hand, if the number of touch point detected by both first and second sensors 110, 120 is one, the processor 150 would determine the handheld device 100 is in the left hand state or the right hand state according to the force comparison (i.e. the force comparison between force F1 applied on the first side S1 and another force F2 applied on the second side S2) (Step S550). It is assumed that, when the handheld device 100 is held by one hand, the force applied by the index finger or middle finger may be larger than the force applied by the thumb or the palm. Therefore, if the force comparison is that the force F1 applied on the second side S1 is larger than the force F2 applied on the first side S2 (i.e. F1>F2) or the force F1 applied on the first side S1 is larger than the force F2 applied on the second side S2 (i.e. F1−F2>$T_F$), the processor 150 determines the handheld device 100 is in the left hand state (Step S560); if the force comparison is that the force F2 applied on the first side S2 is larger than the force F1 applied on the second side S1 (i.e. F2>F1) or the force difference is larger than the force difference threshold $T_F$ (i.e. F2−F1>$T_F$), the processor 150 determines the handheld device 100 is in the right hand state (Step S570).

However, if the force difference is not larger than the force difference threshold $T_F$ (i.e. F1−F2<$T_F$ or F2−F1<$T_F$), the processor 150 use other rules to determine the hold state (Step S555). It should be noticed that, the rules implemented in the step S555 can be referred to the embodiments of step S525 such as the determinations of touch length/area and orientation, and the corresponding description would be omitted.

Figure 6B:
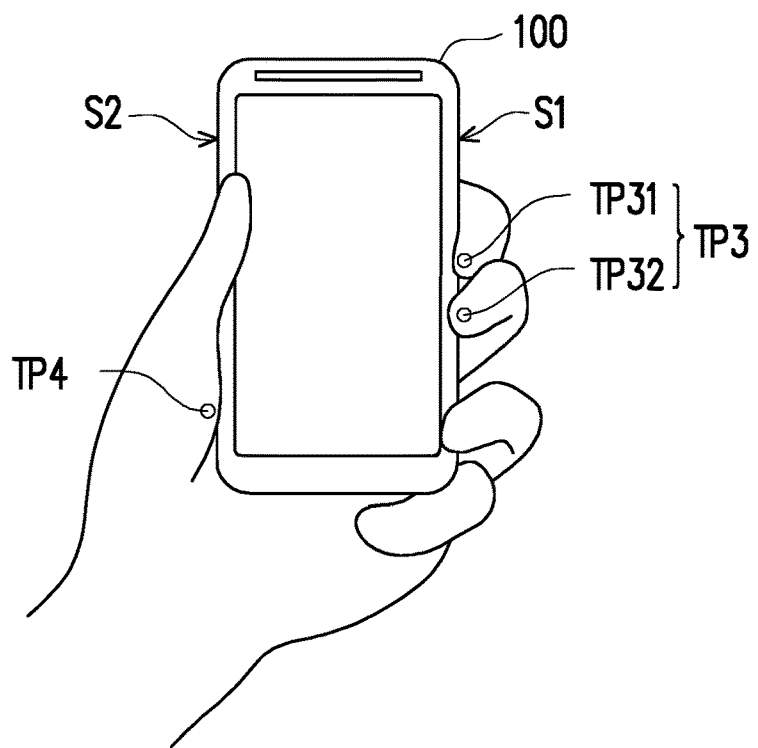

In the following, an example for one touch point detected by both two sensors 110, 120 would be introduced. FIG. 6B is schematic diagram illustrating the handheld device is held by a left hand. Referring to FIG. 6B, the index finger, middle finger and ring finger of the left hand abut against side S1. It assumed that the ring finger does not cover on the first sensor 110 of the handheld device 100, two touch points TP31 and TP32 is too close (for example, the distance between two touch points TP31 and TP32 is less than 1 centimeter), so that the processor 150 would consider that only one touch point TP3 on the side S1. In addition, the palm abuts against side S2, the thumb does not touch the handheld device 100, and the processor 150 detects a touch point TP4. Referring to FIGS. 5 and 6B, because there are one touch point TP3 on the side S1 and one touch point TP4 on the side S2, the processor 150 would determine the force comparison in step S550. Because the force comparison is that the force F1 applied on the touch point TP3 is larger than the force F2 applied on the touch point TP4, the processor 150 would determine the handheld device 100 is in the left hand state (Step S560).

In some exemplary embodiments, the aforementioned conditions (the force difference, the touch area, the touch length, and the orientation of the body 140) may be provided with weights, and the processor 150 can determine the operational hand state is the right or left hand state according to the weight average or the weight sum of the values of these conditions and corresponding weights.

Back to FIG. 4, if the number comparison is that the number difference is not zero or the numbers are different (i.e. the numbers of touch point detected by the first and second sensors 110, 120 are different), the processor 150 would determines whether the handheld device 100 is in the left or right hand state according to touch point distribution, touch length/area, pressure (or force) on two sensors 110, 120 and the distance between touch points detected on each sensor 110, 120 (Step S440, it is called a second determination procedure).

Figure 7:
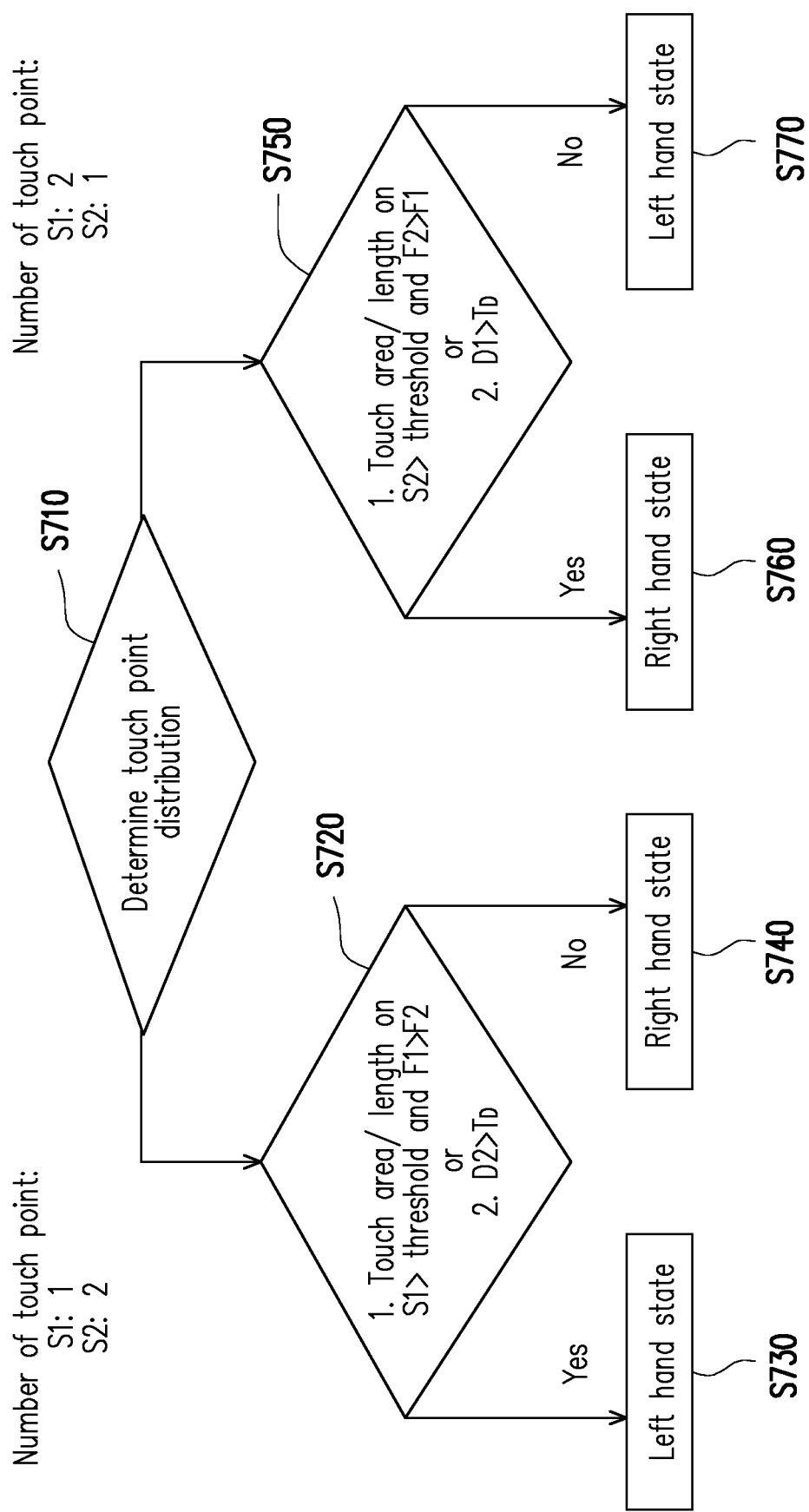
FIG. 7 is a flowchart illustrating a procedure of the handheld device for determining the operational hand state according to one of the exemplary embodiments of the disclosure.

Referring to FIG. 7, in the second determination procedure (i.e. in response to the number comparison being different), the processor 150 would determine whether the number of touch point detected by the second sensor 120 is larger than the number of touch point detected by the first sensor 110 (i.e. the number of fingers detected by the second sensor 120 is two, and the number of finger detected by the first sensor 110 is one) or the number of touch point detected by the first sensor 110 is larger than the second sensor 120 (i.e. the number of fingers detected by the first sensor 110 is two, and the number of finger detected by the second sensor 120 is one) according to the touch point distribution (Step S710). If the number of touch point detected by the second sensor 120 is larger than the number of touch point detected by the first sensor 110 (i.e., the numbers of touch point are 1 on the first side S1 and 2 on the second side S2), the processor 150 determine the handheld device 100 is in the left hand state or the right hand state according to the touch area (or touch length) detected on the first side S1 of the body 140 and the force comparison (Step S720). According to the test result of actual operation, if the touch area or touch length detected on the first side S1 of the body 140 is larger than a second threshold and the force comparison is that the force applied on the first side S1 of the body 140 is larger than the force applied on the second side S2, the processor 150 determines the handheld device 100 is in the left hand state (Step S730); otherwise, the processor 150 determines the handheld device 100 is in the right hand state (Step S740).

In another exemplary embodiment, the processor 150 may determine the handheld device 100 is in the left hand state or the right hand state according to the distance between two touch points on the second side S2 of the body 140 (S720). If the distance between two touch points on the second side S2 of the body 140 is larger a distance threshold $T_D$, the processor 150 determines the handheld device 100 is in the left hand state (Step S730); otherwise, the processor 150 determines the handheld device 100 is in the right hand state (Step S740).

Figure 8A:
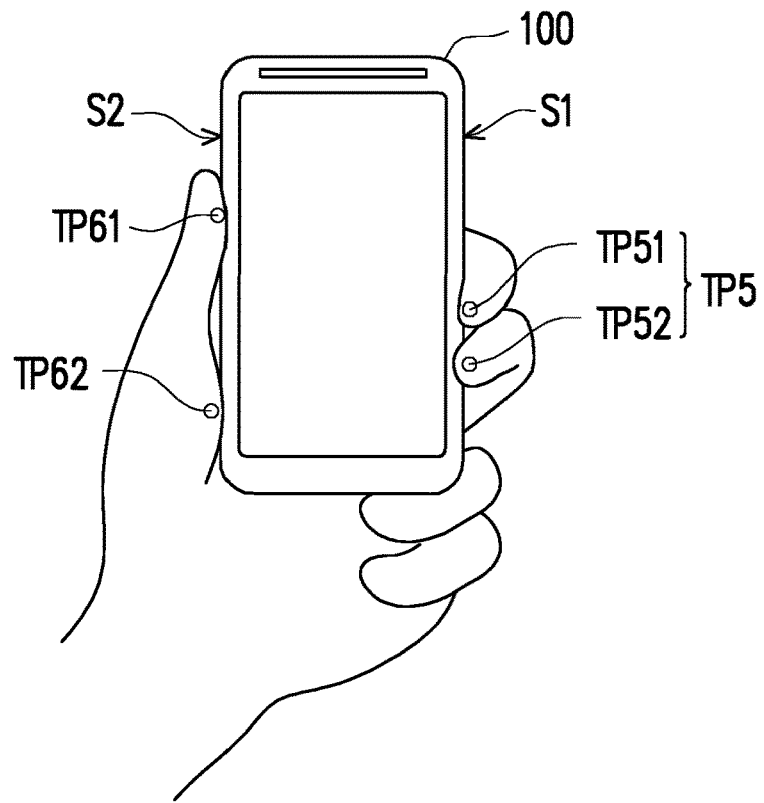
FIG. 8A-8D are schematic diagrams illustrating the handheld device is held in different way.

For example, FIG. 8A is schematic diagram illustrating the handheld device is held by a left hand. Referring to FIG. 8A, the index finger and middle finger of the left hand abut against side S1. It assumed that two touch points TP51 and TP52 is too close (for example, the distance between two touch points TP51 and TP52 is less than 0.8 centimeter), so that the processor 150 would consider that only one touch point TP5 on the side S1. In addition, the thumb and palm abut against side S2, and the processor 150 detects two touch points TP61 and TP62. Referring to FIGS. 7 and 8A, because there are one touch point TP5 on the side S1 and two touch points TP61 and TP62 on the side S2, the processor 150 would determine the touch length/area and the force comparison in step S720. Because the touch length (or touch area) of the touch TP5 on side S1 is larger than second threshold and the force comparison is that the force F1 applied on the touch point TP5 is larger than two forces F2 applied on the touch points TP61 and TP62, or because the distance D2 between the touch points TP61 and TP62 is larger than the distance threshold $T_D$, the processor 150 would determine the handheld device 100 is in the left hand state (Step S730).

Figure 8B:
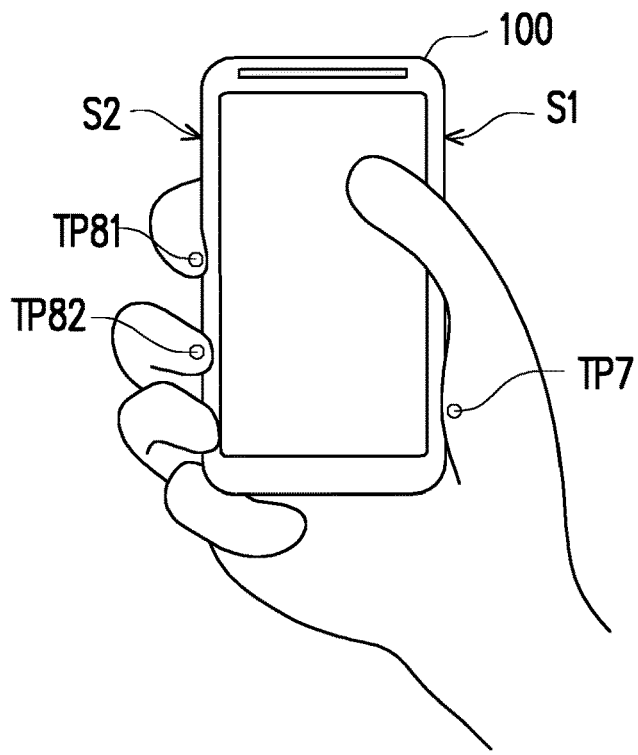

FIG. 8B is schematic diagram illustrating the handheld device is held by a right hand. Referring to FIG. 8B, the index finger and middle finger of the right hand abut against side S2, and the processor 150 detects two touch points TP81 and TP82 on the side S2. In addition, the palm abuts against side S1, the thumb does not touch the handheld device 100, and the processor 150 detects one touch points TP7. Referring to FIGS. 7 and 8B, because there are one touch point TP7 on the side S1 and two touch points TP81 and TP82 on the side S2, the processor 150 would determine the touch length/area and the force comparison in step S720. Although the touch length/area of the touch point TP7 is larger than the second threshold, but the force comparison is that the force F1 applied on the touch point TP7 is less than one force F2 applied on the touch point TP81 or TP82. Therefore, the compared result is not conformed to the left hand state, and the processor 150 would determine the handheld device 100 is in the right hand state (Step S740).

On the other hand, back to FIG. 7, if the number of touch point detected by the first sensor 110 is larger than the number of touch point detected by the second sensor 120 (i.e., the numbers of touch point are 2 on the first side S1 and 1 on the second side S2), the processor 150 determine the handheld device 100 is in the left hand state or the right hand state according to the touch area or touch length detected on the second side S2 of the body 140 and the force comparison (Step S750). According to the test result of actual operation, if the touch area or touch length detected on the second side S2 of the body 140 is larger than a third threshold and the force comparison is that the force applied on the second side S2 of the body 140 is larger than the first side S1, the processor 150 determines the handheld device 100 is in the right hand state (Step S760); otherwise, the processor 150 determines the handheld device 100 is in the left hand state (Step S770).

In another exemplary embodiment, the processor 150 may further determine the handheld device 100 is in the left hand state or the right hand state according to the distance between two touch points on the first side S1 of the body 140 (Step S750). If the distance D1 between two touch points on the first side S1 of the body 140 is larger the distance threshold $T_D$, the processor 150 determines the handheld device 100 is in the right hand state (Step S760); otherwise, the processor 150 determines the handheld device is in the left hand state (S770).

Figure 8C:
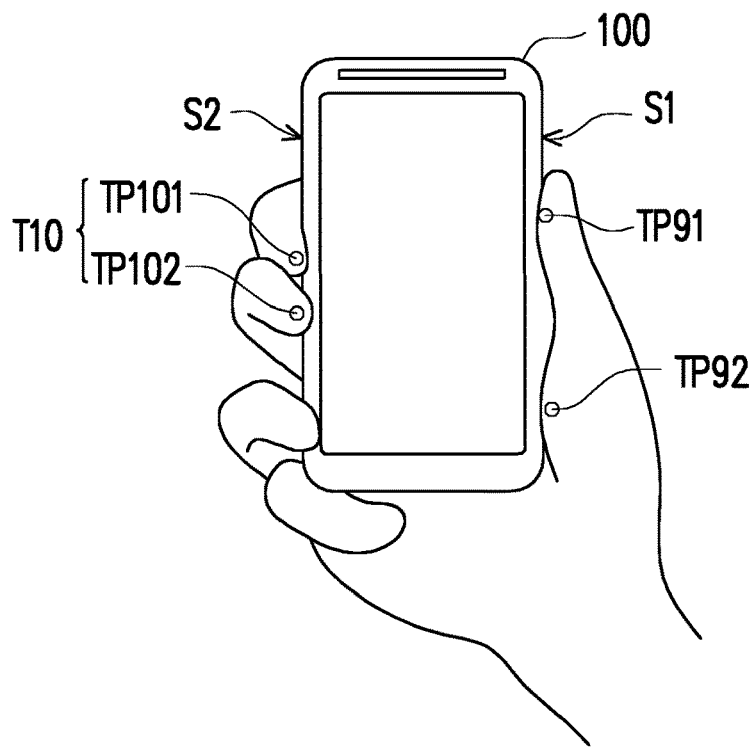

For example, FIG. 8C is schematic diagram illustrating the handheld device is held by a right hand. Referring to FIG. 8C, the index finger, middle finger and ring finger of the right hand abut against side S2. It assumed that two touch points TP101 and TP102 is too close (for example, the distance between two touch points TP101 and TP102 is less than 0.9 centimeter), and the ring finger does not cover the second sensor 120, so that the processor 150 would consider that only one touch point TP10 on the side S2. In addition, the thumb and palm abut against side S1, and the processor 150 detects two touch points TP91 and TP92. Referring to FIGS. 7 and 8C, because there are two touch points TP91 and TP92 on the side S1 and one touch point TP6 on the side S2, the processor 150 would determine the touch length/area and the force comparison in step S750. Because the touch length/area on side S2 is larger than the third threshold and the force comparison is that the force F2 applied on the touch point TP10 is larger than two forces F1 applied on the touch points TP91 and TP92, or because the distance D1 between the touch points TP91 and TP92 is larger than the distance threshold $T_D$, the processor 150 would determine the handheld device 100 is in the right hand state (Step S760).

Figure 8D:
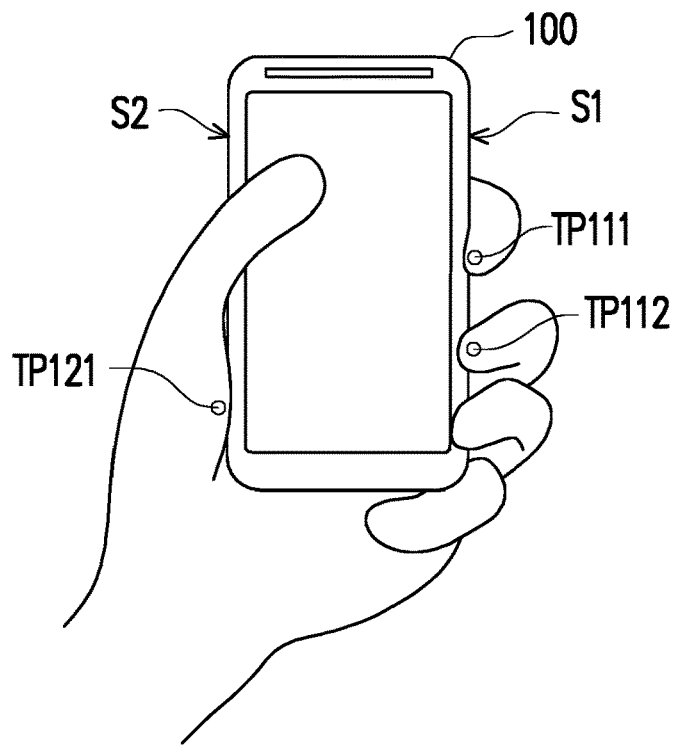

FIG. 8D is schematic diagram illustrating the handheld device is held by a right hand. Referring to FIG. 8D, the index finger, middle finger and ring finger of the right hand abut against side S1, the ring finger does not cover the first sensor 110, and the processor 150 detects two touch points TP111 and TP112 on the side S1. In addition, the palm abuts against side S2, the thumb does not touch the handheld device 100, and the processor 150 detects one touch points TP121. Referring to FIGS. 7 and 8D, because there are two touch points TP111 and TP112 on the side S1 and one touch point TP121 on the side S2, the processor 150 would determine the touch length/area and the force comparison in step S750. Although the touch length/area of the touch point TP121 is larger than the third threshold, but the force comparison is that the force F2 applied on the touch point TP121 is less than one force F1 applied on the touch point TP111 or TP112, or because the distance D1 between the touch points TP111 and TP112 is less than the distance threshold $T_D$, the processor 150 would determine the handheld device 100 is in the left hand state (Step S770).

It should be noticed that, the aforementioned determination of the handheld device 100 is in the left hand state or the right hand state would be performed every specific time interval (e.g. 200, 150, 300 microseconds) when the operational hand state is still the hold state. Similarly, the processor 150 may check whether the operational hand state is the un-hold state or not in the hold state.

Figure 9:
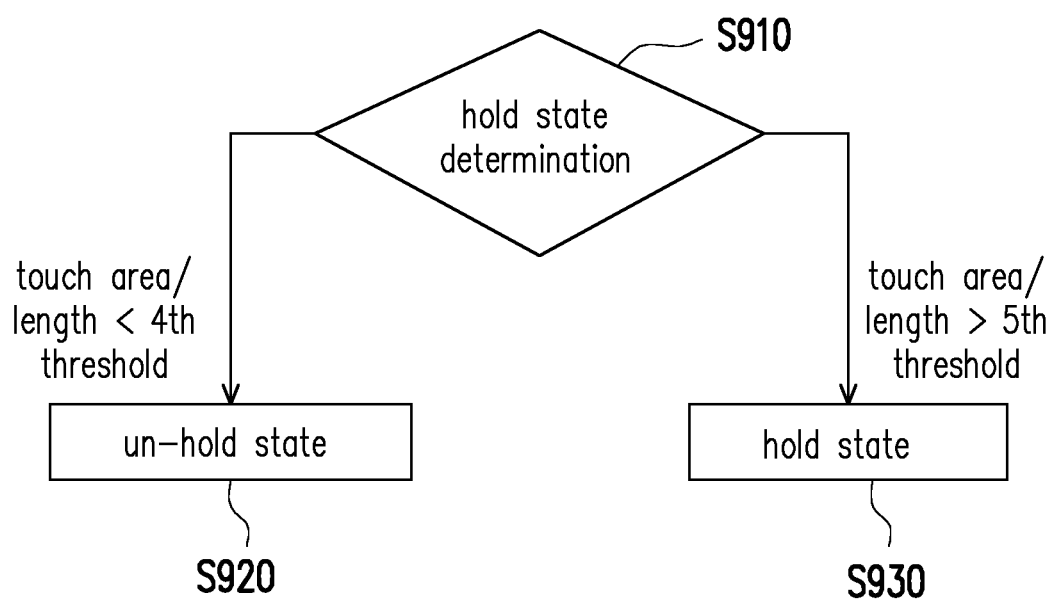
FIG. 9 is a flowchart illustrating a procedure of the handheld device for determining the handheld device is in a un-hold state or a hold state according to one of the exemplary embodiments of the disclosure.

In one embodiment, referring to FIG. 9, before performing the aforementioned determination for the hold state (i.e. one of the sensors 110, 120 does not detect any object, or more than two touch points are detected by both sensors 110, 120), the processor 150 further determines whether the handheld device 100 is in a hold state (Step S910), that is to say, the processor 150 determines whether the handheld device 100 is hold by an object (e.g., finger, or clamp) by determining whether the total touch area or touch length detected on one of the first and second sides S1, S2 of the body 140 is less than a fourth threshold. If the total touch area or touch length detected on one of the first and second sides S1, S2 of the body 140 is less than a fourth threshold (less than the first, second and third thresholds), the processor 150 would determine the handheld device 100 is in the un-hold state (Step S920). The total touch length/area is a summation of touch length/area of the object (e.g., finger, or clamp) on one side S1 or S2.

Figure 10:
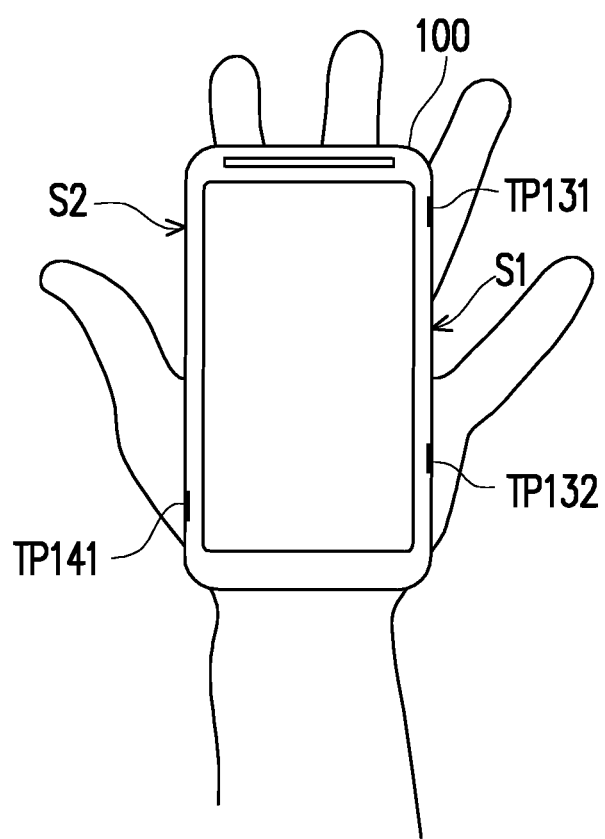
FIG. 10 is a schematic diagram illustrating the handheld device is in a un-hold state.

For example, please refer to FIG. 10. The handheld device 100 is placed on the hand, and the sensors 110, 120 may detect touch points TP131, TP 132 and TP 141 formed by the hand. However, the total length/area of the touch points TP131 and TP 132 on the first side S1 or the touch length/area of the touch point TP 141 on the second side S2 is less than the fourth threshold. Therefore, the processor 150 determines the handheld device 100 is in the un-hold state.

On the other hand, if the total touch area or total touch length detected on one of the first and second sides S1, S2 of the body 140 is larger than a fifth threshold (larger than the fourth threshold), the processor 150 would determine the handheld device 100 is the hold state (Step S930). Similarly, the aforementioned determinations of the un-hold state and the hold state would be performed every specific time interval (e.g. 200, 150, 300 microseconds). Since a user may not keep their force in the same level as one holds the handheld device 100, there is a tolerance between the fifth threshold and the fourth threshold.

In addition, after the right or left hand state is determined, the processor 150 can further provide multiple applications according to the operational hand state. In one exemplary embodiment, if the handheld device 100 is in the right hand state, the processor 150 can display an operating interface corresponding to the first side S1 of the body 140 on the display 130; if the handheld device 100 is in the left hand state, the processor 150 can display an operating interface corresponding to the second side S2 of the body 140 on the display 130. The operating interface could be user interface (UI), window of virtual keyboard, toolbar, application, widget, setting, or app shortcuts. On the other hand, if the handheld device 100 is not in the left or right hand state, the operating interface would not be displayed by the display 130.

Figure 11B:
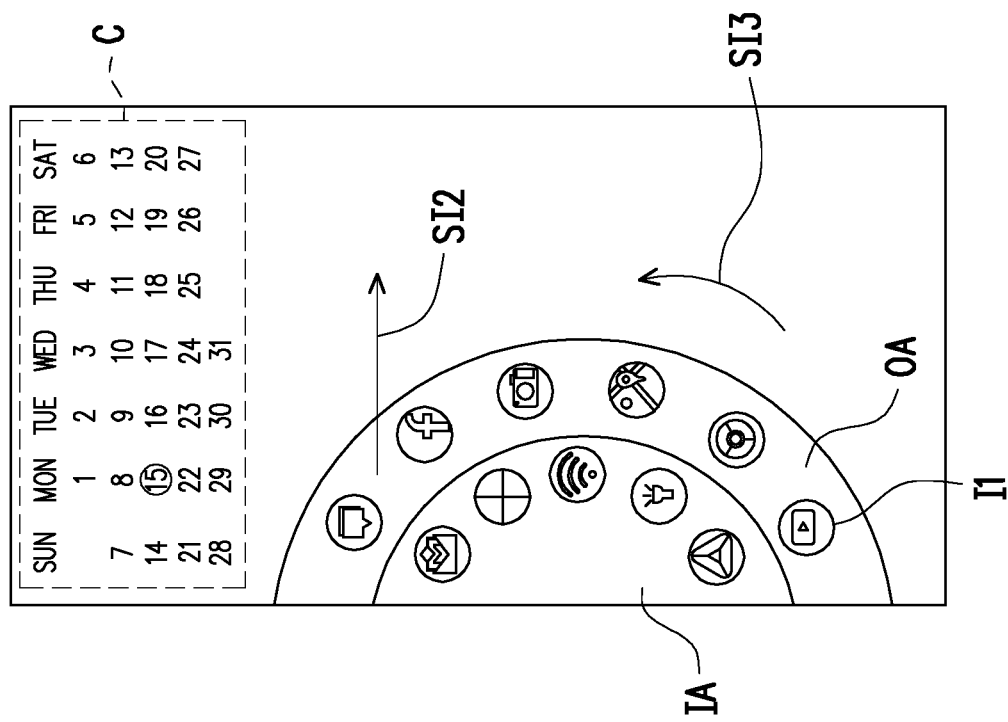
FIGS. 11A and 11B is schematic diagrams illustrating an operating interface corresponding to different sides of the handheld device according to one of the exemplary embodiments of the disclosure.
Figure 11A:
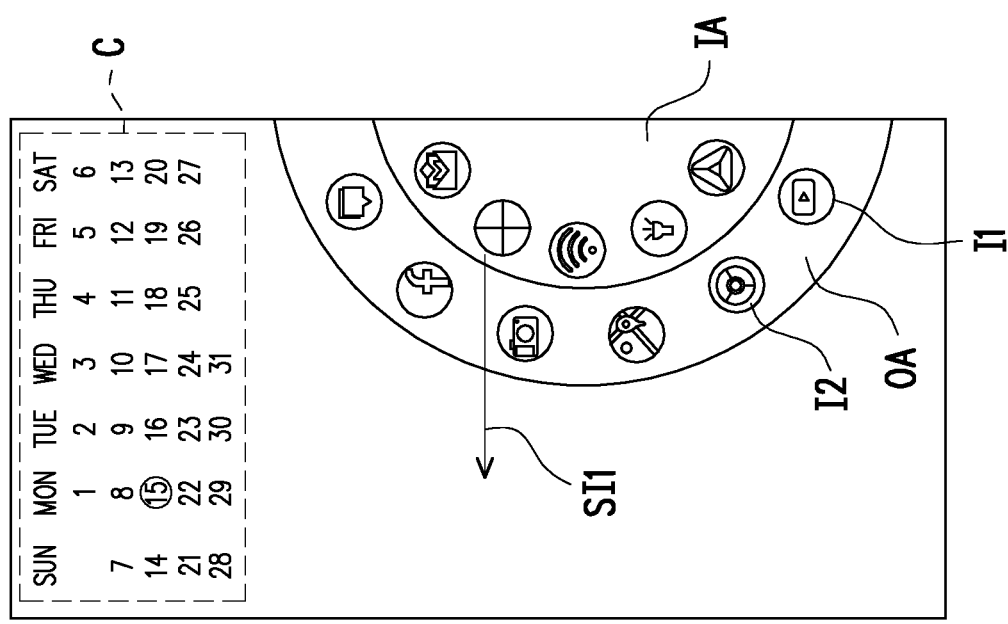

For example, referring to FIG. 11A, a launcher application with an icon shortcut UI is shown on the display 130. The launcher application can be launched by touching corresponding shortcut or squeezing on two sensors 110 and 120. This launcher application includes an outer area OA and an inner area IA arranged with icons such as icons I1, I2, and these icons could be app shortcut, quick setting, function switch, or contact, etc. Referring to FIG. 11A with FIG. 2A, if the handheld device 100 is determined in the right hand state as shown in FIGS. 8B and 8C, the outer and inner areas OA, IA would be presented at the position abutted the first side S1 of the body 140, so that the thumb of right hand can easier to touch the position on the display 130 corresponding to the icons of the icon shortcut UI. On the other hand, if the handheld device 100 is determined in the left hand state as shown in FIGS. 6A, 6B, 8A and 8D, referring to FIGS. 2B and 10B, the outer and inner areas OA, IA would be presented at the position abutted the second side S2 of the body 140, so that the thumb of left hand can easier to touch the position on the display 130 corresponding to the icons of the icon shortcut UI.

In addition, there many operating methods for the launcher application. A user can use siding operation on the display 130 to modify the position of the outer and inner areas OA, IA of UI as shown in FIGS. 11A and 11B. For example, referring to FIG. 11A if the processor 150 detects that a sliding input SI1 from the right side to the left side of the figure on the display 130 for a certain distance, the sliding input SI1 is not applied on calendar C, and the horizontal component of movement of the sliding input SI1 is larger than a threshold. Then, referring to FIG. 11B, the processor 150 may display the outer and inner areas OA, IA at the position abutted the left side of the figure (i.e. near to side S2). On the other hand, if the outer and inner areas OA, IA are located at the position as shown in 11B, and the processor 150 detects that a slide input SI2 from the left side to the right side of the figure on the display 130 for a certain distance, the sliding input SI2 is not applied on calendar C, and the horizontal component of movement of the sliding input S2 is larger than a threshold, the processor 150 may display the outer and inner areas OA, IA at the position abutted the right side of the figure (i.e. near to side S1) as shown in FIG. 11A.

Furthermore, if the processor 150 detect that a sliding input S13 from the bottom toward top of the screen on a first area (e.g. semi-ring are of the outer area OA, or other areas expect for semicircle area of the inner area IA), the outer area OA would be rotated when the vertical moving distance of the sliding input is larger a threshold, and the inner area IA remains the same. For example, the outer area OA rotates clockwise by 10 degrees if the vertical moving direction is upward and the vertical moving distance is 1 centimeter (larger than 0.5 centimeter). On the other hand, if the processor 150 detect that a touch point slides on a second area (e.g. semicircle area of the inner area IA, or other areas expect for semi-ring are of the outer area OA) different from the first area, the inner area IA would be rotated when the vertical moving distance of the sliding input is larger than a threshold, and the outer area OA remains the same. In other words, the outer and inner areas OA, IA can be rotated, respectively, on the basis of the operation on the corresponding operating area of the screen (i.e. the first and second areas). In still another example, the icon shortcut UIs on the outer area OA and the inner area IA may be rotated simultaneously if the sliding input is applied on the area except for the area of the calendar C (or include the area of the calendar C) and the vertical moving distance of the sliding input is larger a threshold.

Moreover, the processor 150 may record usage frequencies of all icons on the icon shortcut UI, and the size, shape, brightness, color or pattern of the icons may be changed according to the usage frequencies. For example, if the usage frequency of the icon I1 is larger than 5 times, the size of the icon I1 would be increased 10%.

The disclosure also provides a non-transitory computer readable recording medium, which records computer program to be loaded into a processor disposed in a handheld device having two sensors disposed on two sides thereof to execute the steps of the proposed method. The computer program is composed of a plurality of program instructions (e.g. an organization chart, establishing program instruction, a table approving program instruction, a setting program instruction, and a deployment program instruction). Once the program sections are loaded into the handheld device and executed by the same, the steps of the proposed method would be accomplished.

In summary, the exemplary embodiments described above depicted an operating method and an electronic device thereof. The handheld device is configured to determine whether in the right or left hand state according to force comparison, distance comparison and/or number comparison between sensing data of the first and second sensors disposed on the left and right sides of the handheld device. Any type of operating interface can be presented on the display and located at the position corresponding to the compared result (the right or left hand state), so that the thumb of hand can easier to operate on the operating interface, and a better operating experience for one hand can be provided.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A handheld device, comprising:
a body;
a first sensor, disposed on a first side of the body;
a second sensor, disposed on a second side of the body different from the first side; and
a processor, coupled to the first and second sensors, and configured for:

obtaining sensing data of the first and second sensors;
determining a force comparison according to the sensing data of the first and second sensors, wherein the force comparison is that force applied on one of the first side and the second side is larger than force applied on the other side; and
determining the handheld device is in a left hand state or a right hand state according to a compared result between sensing data of the first and second sensors comprising the force comparison.

2. The handheld device according to claim 1, wherein the compared result comprises a number comparison between numbers of touch point detected by the first and second sensors and a distance comparison between distance between two touch points on the first and second sides of the body, and the processor is configured for:
in response to the number comparison being the same:
determining the handheld device is in the left hand state or the right hand state according to the distance comparison in response to the number of touch point detected by one of the first and second sensors being two; and
determining the handheld device is in the left hand state or the right hand state according to the force comparison in response to the number of touch point detected by one of the first and second sensors being one.

3. The handheld device according to claim 2, wherein the processor is configured for:
determining whether a force difference of the force comparison is larger than a force difference threshold to confirm the handheld device is in the left hand state or the right hand state.

4. The handheld device according to claim 3, wherein the processor is configured for:
determining whether a touch area or a touch length detected on one of the first and second sides of the body is larger than a first threshold in response to the force difference being not larger than the force difference threshold, to confirm the handheld device is in the left hand state or the right hand state.

5. The handheld device according to claim 2, further comprising:
a third sensor, coupled to the processor; wherein
the processor is configured for:
determining an orientation of the body according to sensing data of the third sensor; and
determining the handheld device is in the left hand state or the right hand state according to the orientation of the body.

6. The handheld device according to claim 1, wherein the compared result comprises a number comparison between numbers of touch point detected by the first and second sensors, and the processor is configured for:
in response the number comparison being different:
determining the handheld device is in the left hand state or the right hand state according to a touch area or a touch length detected on the first side of the body and the force comparison in response to the number of touch point detected by the second sensor being larger than the number of touch point detected by the first side; and
determining the handheld device is in the left hand state or the right hand state according to a touch area or a touch length detected on the second side of the body and the force comparison in response to the number of touch point detected by the first sensor being larger than the number of touch point detected by the second side.

7. The handheld device according to claim 1, wherein the compared result comprises a number comparison between numbers of touch point detected by the first and second sensors, and the processor is configured for:
determining the handheld device is in the left hand state or the right hand state according to a distance between two touch points on one of the first and second sides of the body in response the number comparison being different.

8. The handheld device according to claim 1, wherein the processor is configured for:
determining the handheld device is not in a hold state in response to numbers of touch points detected on the first and second sides of the body being both larger than two or a total touch area or a total touch length detected on one of the first and second sides of the body being less than a second threshold, wherein the hold state comprises the left hand state and the right hand state.

9. The handheld device according to claim 1, wherein the processor is configured for:
determining the handheld device is in a hold state in response to a total touch area or a total touch length detected on one of the first and second sides of the body being larger than a third threshold.

10. The handheld device according to claim 1, further comprising:
a display, coupled to the processor, wherein
the processor is configured for:
displaying an operating interface corresponding to the first side of the body on the display in response to the handheld device being in the right hand state; and
displaying the operating interface corresponding to the second side of the body on the display in response to the handheld device being in the left hand state.

11. A method for operating a handheld device, wherein the handheld device comprises a body, a first sensor disposed on a first side of the body and a second sensor disposed on a second side of the body different from the first side, the method comprising:
obtaining sensing data of the first and second sensors;
determining a force comparison according to the sensing data of the first and second sensors, wherein the force comparison is that force applied on one of the first side and the second side is larger than force applied on the other side; and
determining the handheld device is in a left hand state or a right hand state according to a compared result between sensing data of the first and second sensors comprising the force comparison.

12. The method according to claim 11, wherein the compared result comprises a number comparison between numbers of touch point detected by the first and second sensors and a distance comparison between distance differences of two touch points on the first and second sides of the body, and, in response to the number comparison being the same, the method comprises:
determining the handheld device is in the left hand state or the right hand state according to the distance comparison in response to the number of touch point detected by one of the first and second sensors being two; and
determining the handheld device is in the left hand state or the right hand state according to the force comparison in response to the number of touch point detected by one of the first and second sensors being one.

13. The method according to claim 12, further comprising:
   determining whether a force difference of the force comparison is larger than a force difference threshold to confirm the handheld device is in the left hand state or the right hand state.

14. The method according to claim 13, further comprising:
   determining whether a touch area or a touch length detected on one of the first and second sides of the body is larger than a first threshold in response to the force difference being not larger than the force difference threshold, to confirm the handheld device is in the left hand state or the right hand state.

15. The method according to claim 11, wherein the compared result comprises a number comparison between numbers of touch point detected by the first and second sensors, and in response the number comparison being different, the method comprises:
   determining the handheld device is in the left hand state or the right hand state according to a touch area or a touch length detected on the first side of the body and the force comparison in response to the number of touch point detected by the second sensor being larger than the number of touch point detected by the first sensor; and
   determining the handheld device is in the left hand state or the right hand state according to a touch area or a touch length detected on the second side of the body and the force comparison in response to the number of touch point detected by the first sensor being larger than the number of touch point detected by the second sensor.

16. The method according to claim 11, wherein the compared result comprises a number comparison between numbers of touch point detected by the first and second sensors, and the method further comprises:
   determining the handheld device is in the left hand state or the right hand state according to a distance between two touch points on one of the first and second sides of the body in response the number comparison being different.

17. The method according to claim 11, further comprising:
   determining the handheld device is not in a hold state in response to numbers of touch points detected on the first and second sides of the body being both larger than two or a number of touch point detected by one of the first and second sensors being zero, wherein the hold state comprises the left hand state and the right hand state.

18. The method according to claim 11, further comprising:
   determining the handheld device is in a hold state in response to a total touch area or a total touch length detected on one of the first and second sides of the body being larger than a third threshold.

19. The method according to claim 11, further comprising:
   displaying an operating interface corresponding to the first side of the body on the display in response to the handheld device being in the right hand state; and
   displaying the operating interface corresponding to the second side of the body on the display in response to the handheld device being in the left hand state.

20. A non-transitory computer readable recording medium, recording computer program to be loaded by the processor of the handheld device of claim 1 having two sensors disposed on two sides thereof to execute steps of:
   obtaining sensing data of the two sensors;
   determining a force comparison according to the sensing data of the two sensors, wherein the force comparison is that force applied on one of the two sides is larger than force applied on another of the two sides; and
   determining the handheld device is in a left hand state or a right hand state according to a compared result between sensing data of the two sensors comprising the force comparison, wherein one side of the handheld device corresponds to the right hand state, and another side of the handheld device corresponds to the left hand state.

* * * * *